July 7, 1925. 1,544,917
G. LUTTERMÖLLER
CRANK DRIVE FOR LOCOMOTIVES
Filed Aug. 25, 1921 2 Sheets-Sheet 2
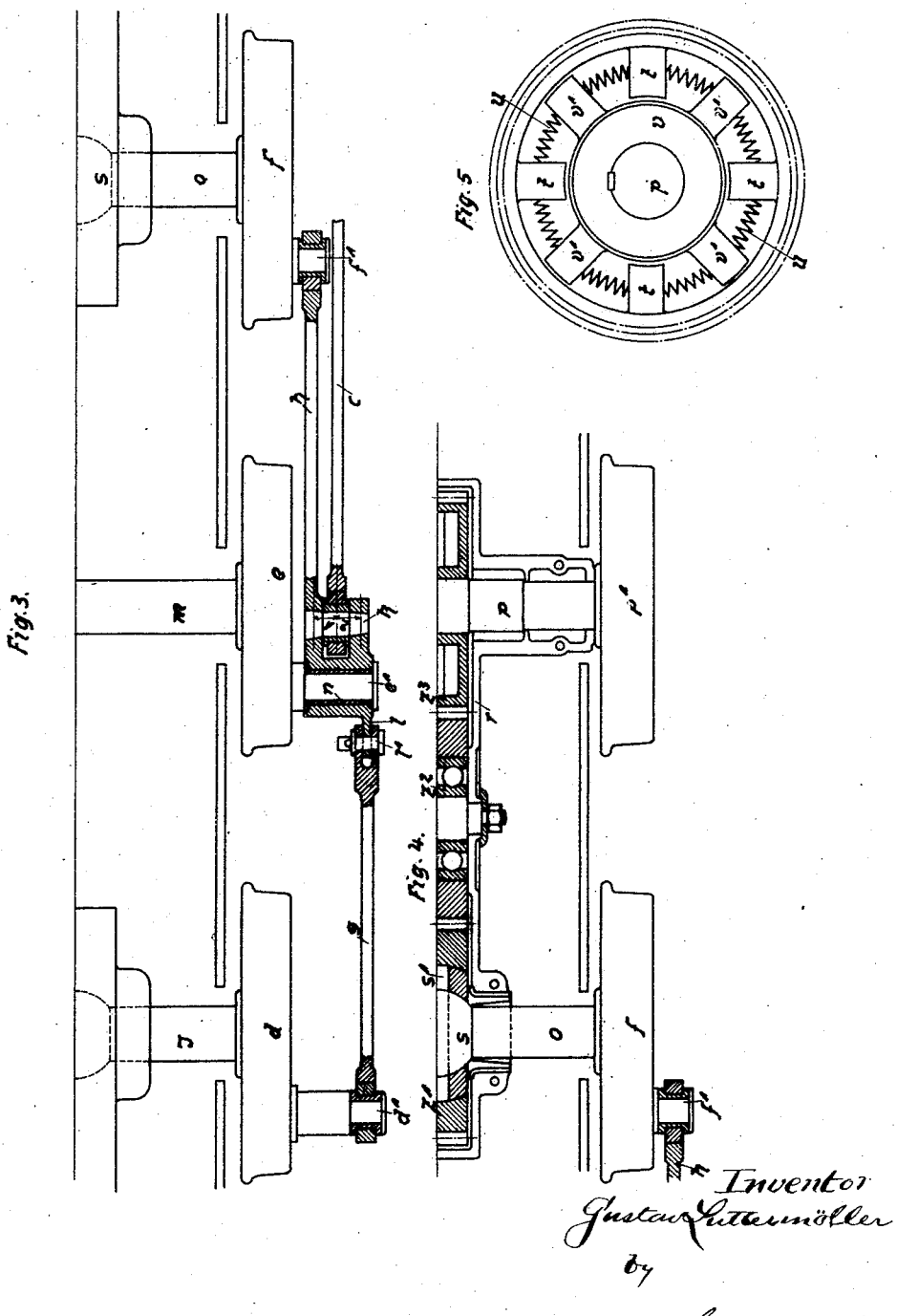

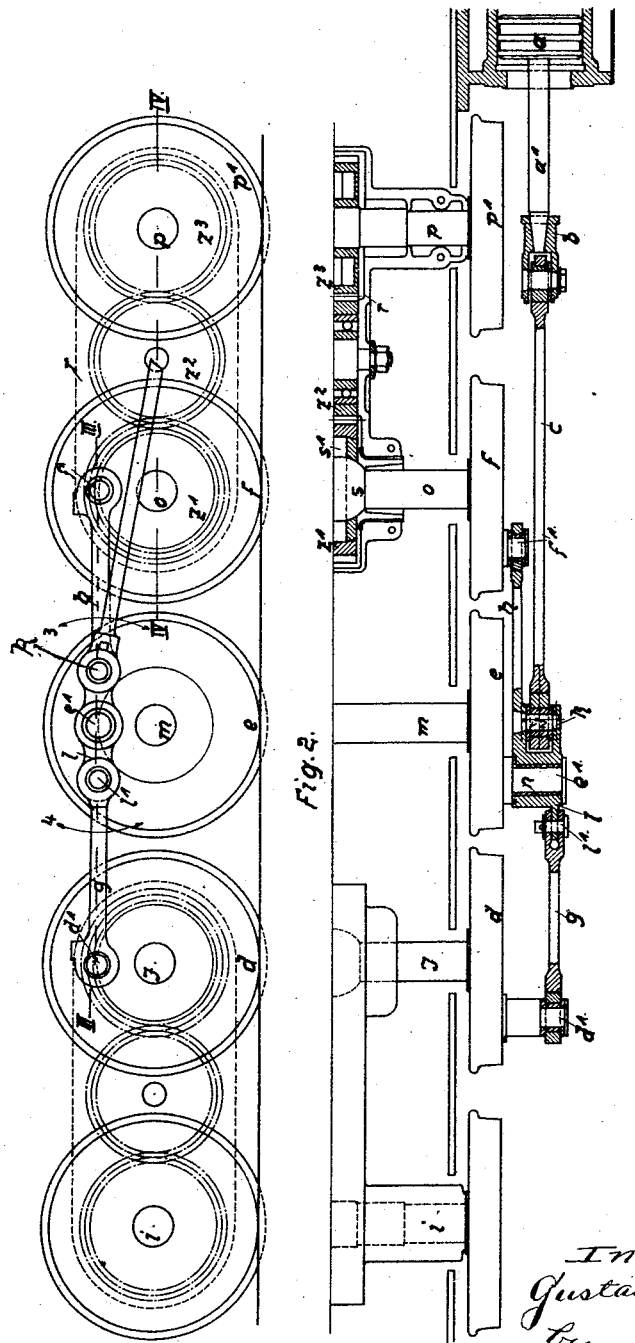

Patented July 7, 1925.

1,544,917

UNITED STATES PATENT OFFICE.

GUSTAV LUTTERMÖLLER, OF POTSDAM, GERMANY.

CRANK DRIVE FOR LOCOMOTIVES.

Application filed August 25, 1921. Serial No. 495,435.

(GRANTED UNDER THE PROVISIONS OF THE ACT OF MARCH 3, 1921, 41 STAT. L., 1313.)

*To all whom it may concern:*

Be it known that I, GUSTAV LUTTERMÖLLER, residing at 27 Seestrasse, Potsdam, Germany, have invented certain new and useful Improvements in Crank Drives for Locomotives, for which applications have been filed in the following countries, in Germany, filed January 22nd, 1918, Patent No. 316,073; in the Netherlands, filed February 28th, 1921; and of which the following is a specification.

This invention relates to crank drives for steam locomotives in which the connecting rod is directly connected to, i. e. directly drives, a point located within the set of coupling or parallel rods.

Gears of this kind are known, but the directly driven point in these is so located as to give rise to supplemental stresses of the parallel rods caused by turning moments in the plane of rotation, or to horizontal bending moments in the crank pin.

In accordance with the fundamental idea underlying this invention these moments are avoided or considerably reduced (1) by providing at least three axles and arranging the connecting rod to apply its force to a point in the set of parallel rods which is in the neighborhood of one of the intermediate axles and lies as nearly as possible in the straight line extending through the coupling or crank pins and (2) by making the horizontal moments of the forces applied to the parallel rods through the connecting rod pin equal by providing suitable leverages.

In applying my invention to locomotives with more than three intercoupled axles the three inner axles coupled to each other by parallel rods may have the remaining axles coupled to them by any known kinds of coupling members. My invention can also be used in cases in which the distance between the wheels necessitates a radial adjustment of the outer axle or axles. In such cases the coupling with the three said axles is preferably effected in accordance with another feature of my invention by a suitable toothed wheel coupling.

A constructional form of my invention is illustrated in the accompanying drawing. Similar parts in various figures have similar signs of reference.

Fig. 1 is a diagrammatic elevation of the bogie of a locomotive,

Fig. 2 a plan view of Fig. 1 with the cranks turned through an angle of 90°,

Fig. 3 is a view similar to Fig. 2 on the line III—III of Fig. 1 in which the parts of the parallel coupling rods are shown on an enlarged scale, Fig. 4 is a plan similar to Fig. 2, partly in section on the line IV—IV of Fig. 1, and showing on an enlarged scale the details of the members for coupling a swivelled or radially adjustable outer axle, Fig. 5 represents a part of the elastic tooth coupling between an outer and an inner axle.

Referring to the drawing, $a$ is a piston with a piston rod $a^1$ which imparts motion in a known manner through a cross-head $b$ to the connecting rod $c$. The three wheels $d$, $e$ and $f$ on the axles $j$, $m$ and $o$ are coupled in a known manner by parallel rods $g$ and $h$ linked to the crank pins $d^1$, $e^1$, $f^1$. But the connecting rod $c$ is not connected as in known driving gears to a point above or beneath the crank pin $e^1$ so as to give rise to moments of rotation, nor does the said rod impart its force to a prolongation of the crank pin $e^1$ so as to subject it to considerable bending moments. Instead of this the rod is linked to a pivot or crank pin $k$ associated with the coupling rod $h$ and located on, or nearly on, the straight line extending through the crank or coupling pins $d^1$, $e^1$, $f^1$. By this arrangement appreciable moments of rotation corresponding to the arrows 3, 4 are prevented from arising in the coupling rods $g$, $h$ which would produce supplemental bending stresses in the coupling rods $g$, $h$. The coupling rod $h$ has an eye or lug $l$ at its left end to which the coupling rod $g$ is linked by a pin $l^1$. The location of the point at which the connecting rod $c$ imparts its force to the coupling rod $h$ is such that the distances 1 and 2 are equal. Since, in the case illustrated, the numbers of axles to be driven to the right and left of the middle axle $m$ are equal, the forces exerted by $g$ and $h$ are also equal and counterbalance each other as the lever arms 1 and 2, Fig. 3 are also equal. By this means all twisting stresses in the head of the coupling rod $h$ are precluded and the wear and tear in the bearing bushing $n$ is made uniform. It is obvious that in cases in which the numbers of coupled axles at either side of the middle axle $m$ are unequal, the forces exerted by the rods at either side of $m$ will correspond to the numbers of axles at the said sides, and that the distances 1 and 2 must be made inversely proportional to the ratio of these forces. In the example illustrated two axles are linked to $m$ at each side of the same. Suppose the left axle $i$ were omitted. The forces at the right of $m$ would then be twice as great as at the left of $m$. The distance 1 should then be only half as great as the distance 2 in order to compensate for this inequality of forces exerted by the rods. The coupling pin $e^1$ is exactly in line with the driving or connecting rod $c$ and therefore receives its driving force directly from the power imparted by the driving rod. Its component can therefore be left out of account in determining the lengths of the levers 1 and 2.

A structural feature resulting from my invention consists in the cylinder only protruding a short distance from the side of the locomotive and in a reduction of the disturbing motion being thus obtained in an advantageous manner.

In the example illustrated the outer coupled axles $i$ and $p$ are swivel end axles capable of radial adjustment, i. e. of turning relatively to the other axles in a horizontal plane. In accordance with my invention these axles are geared to the middle axles through an elastic toothed wheel coupling.

The two swivel locomotive axles $i$ and $p$ are both geared to the middle axles in a similar manner so that it is only necessary to describe the gearing of the axle $p$. This axle is journalled in a frame $r$ which surrounds a number of driving cog wheels $z^1$, $z^2$, $z^3$. The frame is adapted to swing round on a ball journal $s$ at the middle of the axle $o$. Journalled in the frame $r$ are the wheel $z^1$ to which motion is imparted by a carrier $s^1$ and an intermediate wheel $z^2$ which is in mesh with the wheel $z^1$ and also with the wheel $z^3$ mounted on the radially adjustable or swivel axle $p$. The wheels $z^1$, $z^2$, $z^3$ are advantageously arranged in the middle vertical plane of the locomotive as shown. As the axles $o$ and $p$ are geared to each other by toothed gear wheels the track wheels $f$ and $p^1$ are bound to execute equal numbers of revolutions. But another consequence of the coupling of the axles $o$ and $p$ by toothed wheels is that vertical motions of one of the trackwheels $f$ and $p^1$ (which occur at rail joints and at depressions in the rails for instance) give rise to a corresponding rotary motion of the other axle and thus tend to urge on or retard the coupled track wheels, whereby the toothed wheels in engagement with each other would be subjected to violent stresses.

In accordance with my invention these stresses are avoided by the provision of an elastic member in the coupling between the axles. The toothed wheel $z^3$ that drives the swivel axle $p$ is not firmly fixed but yieldingly coupled to the same. Fixed on the axle $p$ is the hub $v$, Fig. 5, which carries radial arms $v^1$. The rim of the toothed wheel $z^3$ has inwardly extending radial arms $t$. Arranged between the arms $v^1$ and $t$ are compression springs $u$. In this way an elastic coupling is produced which enables each of the two axles $o$ and $p$ to turn beyond, or remain behind, the position of rotation determined by the engaging toothed wheels.

I am aware of the fact that there is no novelty in driving locomotive axles with the aid of elastic drives, a known combination being for example a driven axle elastically coupled to an electromotor mounted directly upon it. But by this form of elastic coupling it is only possible to equalize the fluctuations in the driving power of the motor and the fluctuations of the resistances to be overcome during travelling.

The application of the known elastic connecting gear to swivel axles of locomotives offers special advantages. The rotation of the track wheel mounted on the swivel axle is dependent on the rotation of the wheel on the driving axle in two ways. Since both wheels are of equal size, and travel on the same rail, the swivel wheel, on account of its engagement with the rail, should execute the same number of revolutions as the driving wheel, even if it were not geared to the latter through toothed wheels. But as they are geared to each other through toothed wheels this circumstance also will result in their executing the same number of turns when they travel in the direction of the straight line extending through them. In such cases the two different driving agencies acting on the swivel wheel (the rail and the toothed wheel) produce exactly the same result and do not interfere with each other. But if one of the axles executes a vertical movement independently of the other (e. g. in travelling over a rail joint or a depression in the rail) a supplemental rotary movement will be imparted to the one wheel in one direction or the other, because in such a case the one wheel of the toothed wheel gear will execute a slight rotary motion around the centre of the other wheel. The consequence of this is that the one track wheel will glide along the rail and that some of the teeth of the gear wheel will be subjected to extraordinary stresses. Another well known result of one or both of the wheels of an axle slipping on a rail (or the rails) is that the whole locomotive commences pitching, because the adhesion of the remaining wheels is generally not sufficient to transmit the driving power to the body of the machine.

By the above-described elastic connection between the toothed wheel and the swivel axle driven by it this fault is eliminated.

I claim:—

1. The combination with a locomotive having at least three parallel driving axles, driving wheels thereon, crank pins on the wheels and connecting rods connecting the pins; of a pin stationarily fixed to one of said rods close to an intermediate crank pin, and a driving rod on said fixed pin, the line of thrust of said driving rod spaced between the lines of thrust of said connecting rods inversely proportionally to the number of driving axles on each side of the point of connection between said driving and connecting rods.

2. A locomotive having driving axles, wheels thereon, and crank pins on some of the intermediate wheels, said crank pins connected together by coupling rods; in combination with an additional axle in pivotal driving connection with one of the aforesaid axles, a driving rod connected to one of said coupling rods at a point near an intermediate crank pin, said driving rod having its line of thrust between the lines of thrust of said coupling rods and spaced therefrom inversely proportionally to the number of driving axles on each side of the point of connection between said driving and connecting rods.

3. A locomotive having a set of driving axles, wheels thereon and crank pins on said wheels; in combination with two coupling rods connecting the crank pins, a pivotal axle at each end of the set of driving axles in driven connection with the axle of the set, and a driving rod arranged on one of the coupling rods whose line of thrust lies in a vertical plane between the vertical planes in which the lines of thrust of said coupling rods lie and spaced therefrom inversely proportionally to the number of driving axles on each side of the point of connection of said driving and coupling rods.

4. A locomotive having a set of three driving axles, wheels thereon and crank pins; in combination with coupling rods connecting the fore and aft wheels to the middle wheel, said rods lying in different planes, a driving rod connected to one of the coupling rods and lying in a plane between the two coupling rods, a swiveled axle, and gearing between one of the aforesaid axles and said swiveled axle, said gearing including a yielding gear wheel on one of the axles.

5. A locomotive having a driving axle, in combination with a swiveled axle, a gear wheel on said driving axle and a yielding gear wheel on said swiveled axle, a frame inclosing said gear wheels and an intermediate gear wheel carried by said frame, said frame and gear wheels arranged at the middles of said axles.

In testimony whereof I have signed this specification in the presence of two witnesses.

GUSTAV LUTTERMÖLLER.

Witnesses:
JOHANNES THURMS,
KURT HARTLEYS.